United States Patent [19]

Kaesemeyer

[11] 3,720,124

[45] March 13, 1973

[54] ROTARY WORK DRIVER FOR MACHINE TOOLS

[75] Inventor: Carl W. Kaesemeyer, Cincinnati, Ohio

[73] Assignee: Cincinnati Milacron Inc., Cincinnati, Ohio

[22] Filed: May 20, 1971

[21] Appl. No.: 145,293

[52] U.S. Cl. .......................................... 82/40, 279/2
[51] Int. Cl. .................................................. B23b 33/00
[58] Field of Search ....... 82/40, 44; 279/1 R, 1 SG, 2, 279/46

[56] References Cited

UNITED STATES PATENTS

| | | | |
|---|---|---|---|
| 1,843,073 | 1/1932 | Wagner | 82/40 |
| 2,765,175 | 10/1956 | Parker et al. | 279/1 Q |
| 2,346,706 | 4/1944 | Stoner | 279/46 |
| 2,082,345 | 6/1937 | Lasser | 82/44 |
| 2,468,867 | 5/1949 | Collins | 279/2 |

Primary Examiner—Leonidas Vlachos
Attorney—Jack J. Earl and Howard T. Keiser

[57] ABSTRACT

This specification and drawings disclose a work driver in combination with a machine tool such as a precision grinding machine or a lathe. The device has a series of tooth-like sprags to surround a workpiece and apply a rotational drive force in one direction to that workpiece in opposition to the force produced during a machining operation. Each of the sprags is movable in a limited swinging motion independent of the other sprags to permit the variation in size and eccentricity normally found in a series of similar unfinished workpieces in a manufacturing operation. Further, the device is shown to have in its preferred form an axial motion to facilitate positioning and removal of workpieces prior and subsequent to machining and to account for variations in length of workpiece and inaccuracies in center hole depths. Controls are also included in the disclosure to permit the device to be used with an automatic machine.

2 Claims, 7 Drawing Figures

INVENTOR.
CARL W. KAESEMEYER
BY Jack J. Earl
& Howard A. Keiser
ATTORNEYS 3,720,124

ROTARY WORK DRIVER FOR MACHINE TOOLS

BACKGROUND OF THE INVENTION

In recent years, developments have occurred in the metal working industry that have placed demands for higher torque transmission to workpieces which are rotated in opposition to the cutting forces of machining operations. For example, the use of wider grinding wheels contoured to form complete parts in a single plunge cut has resulted in an upward scaling of forces needed to rotate a workpiece during the plunge grinding operation.

At this same time, increasing costs of materials have dictated that less excess volume be designed into parts. Conventionally, some excess material is provided on many workpieces as the portion to which the rotational torque is applied during turning and grinding but designers are striving to reduce this excess to a minimum. The use of higher torque but decreased area for transmission of the torque, has caused severe problems in the manufacturing processes where it is desired to use the most modern of tools and techniques.

As will be apparent from the ensuing detailed description this invention provides a work driver capable of transmitting very high torque to a workpiece but which requires that only a relatively small portion of the workpiece be inserted into the driver.

Since in a conventional manufacturing situation a series of similar workpieces will vary slightly in size and eccentricity, this invention further provides a work driver which will accomodate these variations without adversely affecting the high torque capacity of the device.

SUMMARY OF THE INVENTION

The device of this invention is used in a machine that supports a workpiece between centers. The workpiece is rotated on the centers during a machining operation. Examples of such machines are lathes and precision cylindrical grinding machines. A source of rotary power is provided in a headstock to drive the workpiece rotationally. The driver of this invention includes a plurality of sprags which surround the headstock work supporting center and engage the workpiece to rotate it in one direction. Each of the sprags is supported for independent swinging motion about its end radially remote from the workpiece. A resilient interface material is embraced between adjacent sprags tending to produce transmission of a force from one sprag to the entire array but permitting each sprag to swing through a small range independent of a following motion by the other sprags by compression or expansion of the resilient interface. The array of sprags is mounted on a carrier member which is rotated by the headstock and which is supported for limited motion in a direction along the axis of the workpiece. The carrier member is normally biased to a position at the outward extreme of its range of movement toward the workpiece, but can be shifted by placement of a workpiece against the side of the sprags when the sprags are not in position around the periphery of a portion of the workpiece. A control system is provided to jog the driver in a reverse direction causing the individual sprags to swing radially out for movement over the workpiece as the bias force on the carrier members shifts the array toward the outward extreme position. Thereafter the carrier member is rotated in the forward direction to rotate the work during a machining operation.

THE DRAWINGS

DETAILED DESCRIPTION

Figure 1:
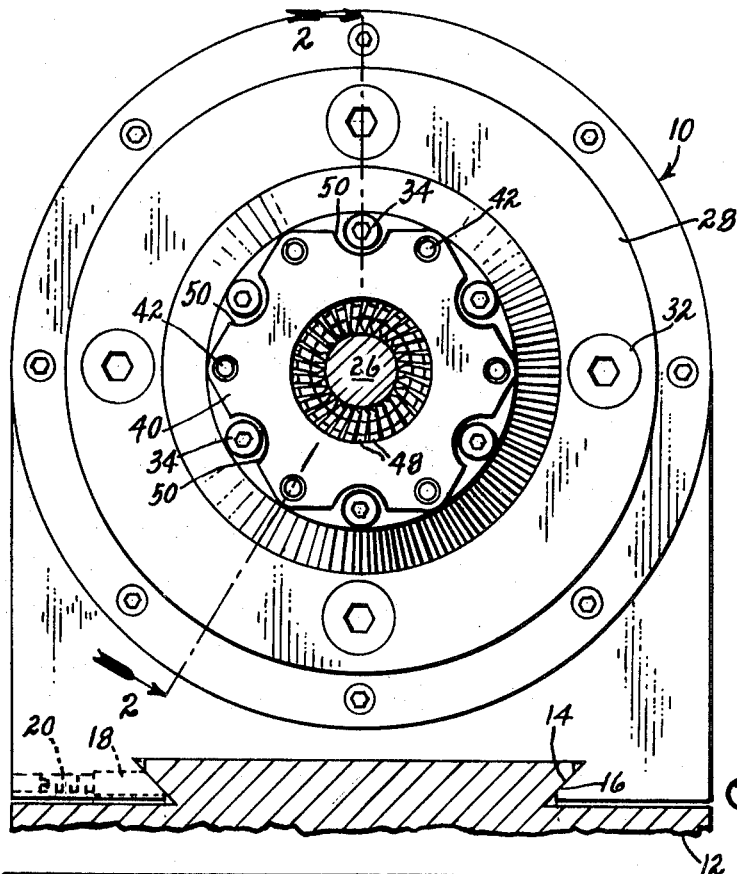
FIG. 1 is a front elevational view of a portion of a machine tool headstock.

The driving mechanism of this invention is shown in the present specification in combination with a headstock 10 (FIGS. 1 and 2) of the type conventionally used in a precision cylindrical grinding machine. The headstock 10 is supported at a selected location on the top of a table structure 12 which, for purposes of simplification, can be considered as a portion of the base structure of the machine. For purposes of accurate centerline location the headstock 10 and table 12 are provided with mating dovetail way surfaces 14 and 16, respectively. A set of clamping wedges 18 are received in the headstock 10 for forceful engagement with one side of the table dovetail way 16 when screws 20 are tightened thereagainst. The interaction of the wedges 18 and the ways 14, 16 produce a high friction bearing area tending to hold the headstock 10 at the selected position along the table 12.

Inside the headstock 10 is a live center spindle 22 that is supported for rotation therein by conventional bearings (not shown). As shown best in FIG. 2, the center spindle 22 terminates in a projecting conical center 24 that is concentric about the axis of rotation of the spindle 22. The center 24 is intended to engage one end of a workpiece 26 in a center hole complementary to the conical shape of the center 24. The end of the workpiece 26 opposite the end shown, is supported by another similar center (not shown). This other center forcefully moves against and into the workpiece 26 to hold it snuggly on the center 24. The described support of the workpiece 22 on centers is a conventional form of support for workpieces in the machine tool art.

The workpiece 26 is rotated during a machining operation and in the embodiment shown, as viewed in FIG. 1, the forward direction of rotation is counter-clockwise. The reactive forces of cutting are applied to the work 26 in a manner such that they tend to rotate the work in the clockwise direction in opposition to the headstock apparatus. It is the apparatus of this invention which transmits the rotational drive energy from the spindle center 22 to the work 26 in a positive manner. The apparatus includes an annular member 28 that is located accurately on the spindle 22 by the interaction of mating conical surfaces 30 and which is fixed to the spindle 22 by machine screws 32. A set of studs 34 are threaded into the member 28 and extend axially outward therefrom to loosely support an annular plate 36. Compressed between the member 28 and the plate 36 is a set of springs 38, each of which is supported in place by one of the studs 34. An open centered retainer member 40 is attached to the plate 36 by screws 42 and includes a flange 44 that extends around its internal diameter to embrace a clutch ring 46 and a portion of each of a set of sprags 48 that are held inside the ring 46 in an array around the center 24. The studs 34 extend loosely through the clutch ring 46 and into clearance notches 50 in the retainer member 40. The screws 42 are threaded into the retainer 40 and extend loosely through the clutch ring 46. The ring 46 is firmly held in place between the plate 36 and the retainer 40 by a clamping force provided by tightening of the screws 42 to pull the plate 36 and retainer 40 toward one another.

Figure 4:
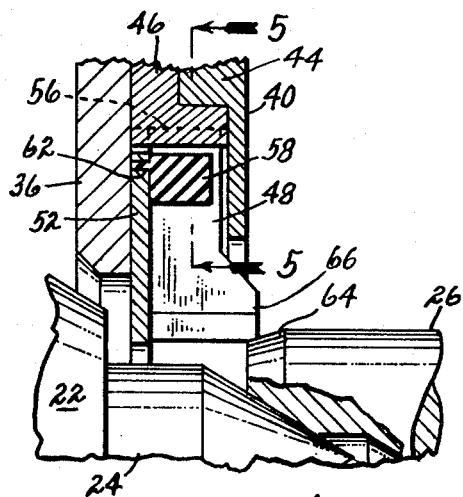
FIG. 4 is a section view of the structure of FIG. 3 taken on the reference plane 4—4.

As shown best in FIG. 4 the sprags 48 are carried on one side of an annular mounting plate 52 that fits closely inside the retainer ring 46 and adjacent to the plate 36. The sprags 48 and carrying plate 52 are not tightly confined between the retainer 40 and the plate 36 so that the sprags 48 will be free to move in a limited manner as will be apparent from the ensuing description.

Figure 5:
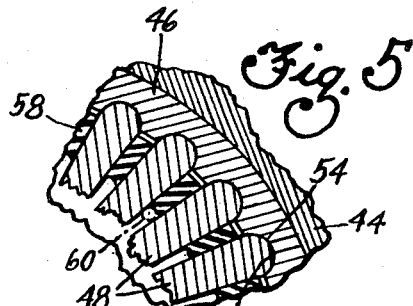
FIG. 5 is a partial section of the apparatus viewed along the reference plane 5—5 in FIG. 4.

Each of the sprags 48 terminates with a cylindrical surface 54 at its radially outward end. The cylindrical surfaces are seated in mating notches 56 in the clutch ring 46, these being in alignment parallel to the axis of rotation of the workpiece 26 and spindle center 22. This provides a hinge-like connection and permits a swinging movement of each of the sprags 48 about the center of its cylindrical surface 54. The sprags 48 are attached to the mounting ring 52 by a resilient adhesive substance 58 which permits some swinging motion of the sprags 48. This substance 58 is applied during assembly when the sprags 48 are positioned uniformly in the ring 46 and on the plate 52 which is fitted inside the clutch ring 46 and supported on a horizontal surface. To provide for uniform spacing of the sprags 48 during application of the substance 58, a side dam is provided in the form of a short cylindrical piece of plastic 60 (one shown in phantom in FIG. 5) embraced between adjacent sprags 48. This material may be a piece of standard tubing of suitable diameter cut to appropriate lengths and may be, for example, TYGON plastic tubing sold by Norton Chemical Process Products Division, Akron, Ohio, it being a material to which the substance 58 will not adhere, thus permitting its removal after application of the substance 58. The substance 58 when set has a rubber-like consistency and adheres firmly to the sprags 48, and the plate 52. One such substance which has been found to be useful in this device is 3M SCOTCH SEAL, industrial sealant filler, Grade 801 Base and 801 Accelerator available from the 3M Company, St. Paul, Minnesota. To aid in holding the substance 58 in place during use of the driver, the plate 52 has a hole 62 therein between each set of adjacent sprags 48 into which the substance 58 extends. The surface finish of these holes is not smoothed by any operation subsequent to their being drilled and therefore has a roughness to enhance the adhesion and strengthen the bond of the substance 58. It will be appreciated that with limited swinging motion of the sprags 48 the adhesive bond of the substance 58 on the plate 52 will be partly destroyed through a shearing action. The additional bond in the holes 62 will not be damaged in normal usage thus insuring that the sprags 48 and plate 52 will maintain a resilient bonding together.

The positioning of the resilient substance 58 in the space between the adjacent sprags 48 will permit independent motion of each single sprag 48 but will tend to cause all of the sprags to follow the motion of any one unless motion is stopped by some unyielding body. The rubber-like material 58, yieldably ties the sprags together and holds them on the plate 52. Slight eccentricities of the workpiece 26 will also be accommodated by the assembly as described since the sprags 48 can be swung at a slightly different angle on one side and the other of the workpiece 26. Similarly, irregularities in the work 26 can also be accommodated by small variations in the swing of the sprag 48. In any case, the slightly differing angular position of the sprags 48 will not affect their ability collectively to transmit rotational drive to the workpiece 26.

Figure 2:
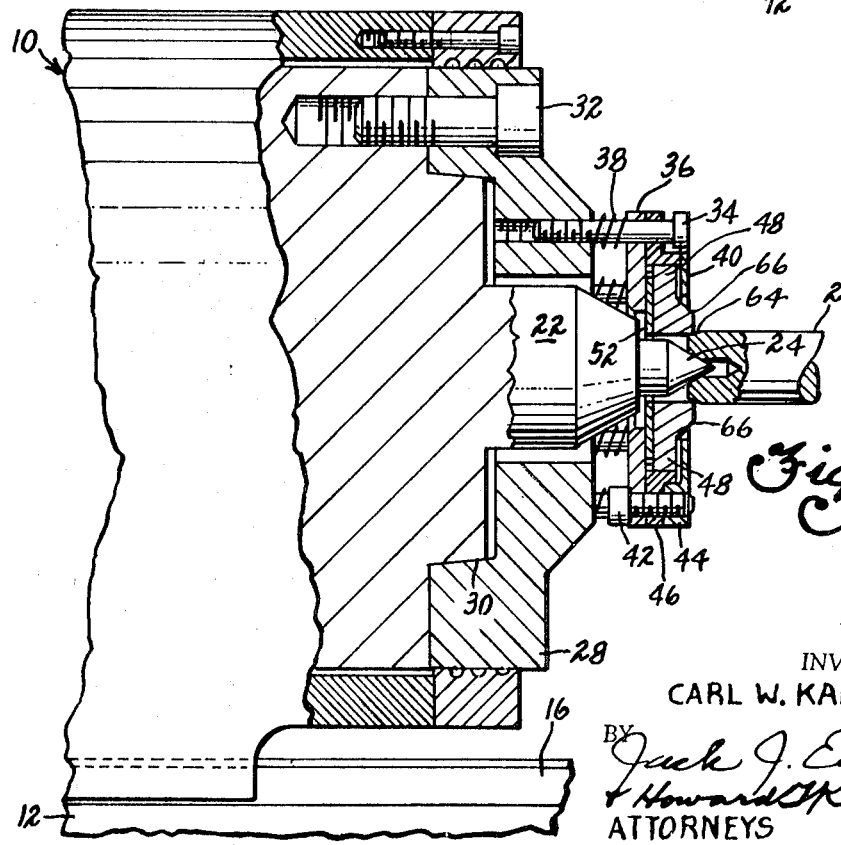
FIG. 2 is a sectional view of the headstock, the section being identified by the reference plane 2—2 in FIG. 1.
Figure 3:
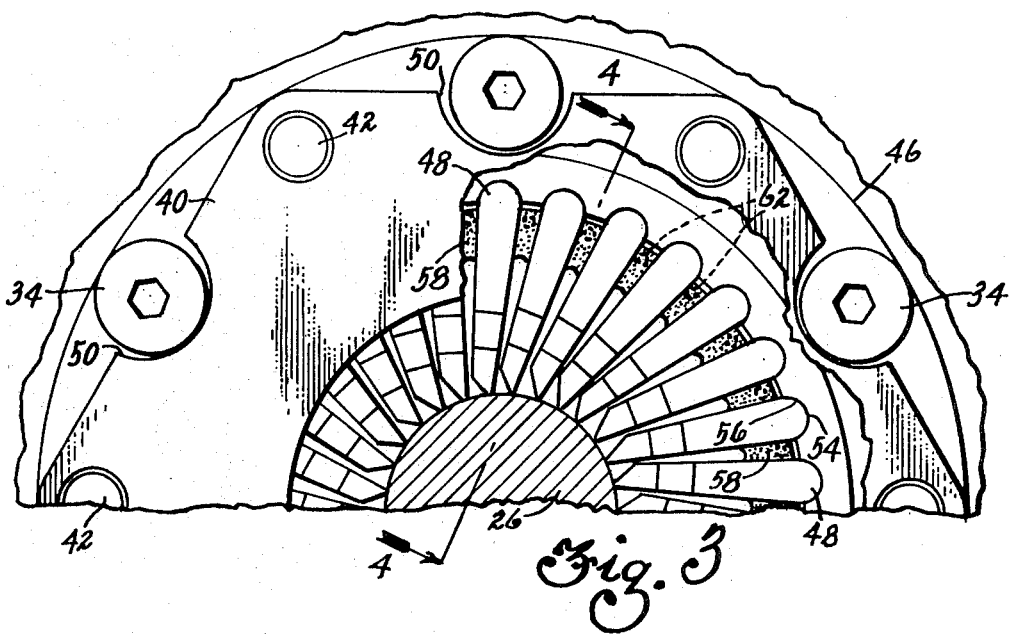
FIG. 3 is an enlarged view of a portion of FIG. 1 with cover plates partly broken away to expose the assembly details in full.
Figure 6:
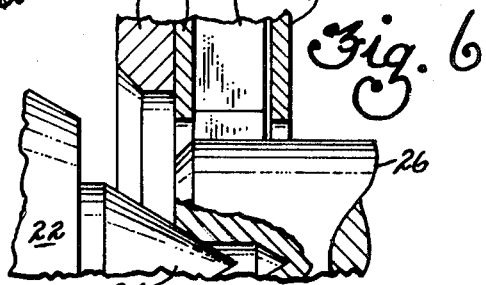
FIG. 6 is a section similar to that of FIG. 4 in which some of the parts have an altered shape.

It has been found that the device described is highly effective and efficient. In one case, it has found to be sufficient for the sprags 48 to engage only at a very small corner area, as shown in FIGS. 2 and 4, on a chamfered surface 64. In such a case, it is then possible to finish machine or grind the entire straight cylindrical surface of the workpiece 26. In such a case, each of the sprags 48 is provided with a side projecting portion 66 that extends outward beyond the retainer 40 to engage the work 26 on the chamfered end 64. It is also apparent that the work 26 and sprags 48 can be so shaped as to permit the cylindrical outer surface to extend into the chuck assembly to a greater depth. This is shown in the partial view of FIG. 6 in which the spindle 22 is furnished with a center portion that extends less far through the sprags 48 such that the work 26 is engaged by each of the sprags 48 along its full width. It can also be appreciated that for very high torque applications or applications where a stepped diameter end might be available to grip in a chuck apparatus, multiple rings of sprag teeth may be assembled and retained in a similar manner to that described so as to increase the driving force capacity. Such an assembly is not shown herein since it is believed possible to be provided by one ordinarily skilled in the art who has the present disclosure in hand.

Figure 7:
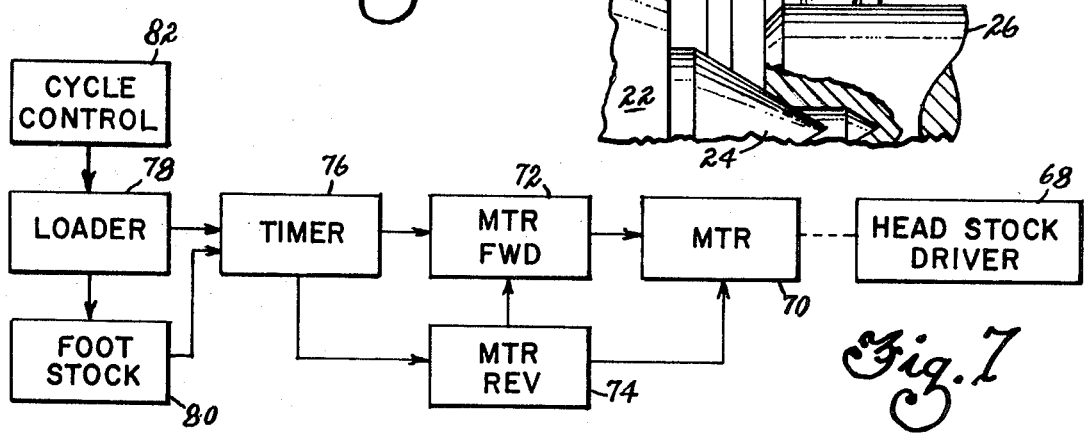
FIG. 7 is a schematic showing of a control system to operate the headstock apparatus of FIGS. 1 through 4.

The apparatus of this invention is adapted for use in automatic cycle machines and the diagram of FIG. 7 represents in block form a control system such as used for operating the apparatus shown in FIGS. 1 through 5. The headstock spindle driver is represented by the block 68 and includes the mechanism of the work driver and live spindle as described. The apparatus 68 is driven by a reversible motor 70. Control of direction of operation of the motor is by relays represented by blocks 72 and 74. Solid connecting lines in the system represent electrical signal transmission paths. The motor forward relay 72 produces rotation of the driver counter-clockwise as viewed in FIGS. 1 and 3 while the relay 74 causes the motor 70 to be energized to rotate the driver 68 in the opposite direction. The energization of the relays 72 and 74 is controlled by a signal timer 76 which receives inputs from limit switches attached to an automatic loader 78 and the footstock 80. The loader 78 can be any conventional mechanical system for placing a workpiece between the headstock 10 in alignment with the axis of the spindle 22 and the footstock 80 that is normally spaced from the headstock on the table 12. The footstock 80 is conventional in that it has a center (not shown) which extends outward when operated to engage the workpiece 26 in a manner similar to the engagement of the center 24 with the workpiece 26. The loader 78 signals the footstock 80, to initiate its operation.

In a cycle of operation, the loader 78 will signal completion of its task of placing a new workpiece 26 in alignment with the headstock. The footstock 80 is caused to begin its advance to push the work 26 onto the headstock center 24. Both of these occurrences are transmitted to the timer 76 that produces a signal energizing the motor reverse relay 74 that drives the sprag members 48 in a clockwise movement tending to open the driver to admit the end of the workpiece 26 inside the sprags 48. The springs 38 are such that should the work engage the sides of the sprags as the footstock 80 is caused to advance and before the reverse rotation is begun, the whole assembly will yield and then move back outward toward its entrance position upon opening of the mechanism. As shown in the specific embodiment of FIG. 2, the shape of the part 26 at its chamfered end 64 stops the return of the sprags 48 prior to full outward movement, but the springs 38 will maintain firm engagement. This will operate to accommodate small length variations of the work without problem.

The timer 76 energizes the reverse relay 74 for sufficient time to reverse the motor 70 and insure that the chuck mechanism has opened and received the end 64 of the workpiece 26. Thereafter the timer 76 operates to energize the forward relay 72 and the motor 70 is caused to drive the headstock in the forward direction during a machining operation. This occurs under operation of the cycle control logic unit 82 which controls the actual machining cycle. At its conclusion, the timer 76 is caused to operate and deenergize the relay 72 and to reversely operate the footstock 80. At the same time the loader is activated to remove the workpiece 26 prior to insertion of a new part and initiation of a new cycle.

What is claimed is:

1. A machine tool work driver for transmitting torque to the outside surface of revolution of a workpiece comprising in combination:
   a. an annular mounting plate;
   b. a set of sprags spaced from one another and arrayed around said mounting plate and each having an end projecting toward a central opening through the array and said mounting plate, the projecting ends adapted to engage a workpiece on the outside surface thereof for transmission of torque thereto in one direction;
   c. a retainer ring surrounding said annular plate having a swivel socket for each sprag spaced around an inside diameter thereof, each of the sprags being confined at the end opposite the projecting end for swinging movement about an axis through the opposite end of each sprag;
   d. a resilient material adhering to said sprag and mounting plate and filling a portion of the space between adjacent sprags;
   e. means for supporting one end of a workpiece in a position extending into the central opening through said array of sprags; and
   f. means for rotating said mounting plate and sprags in said one direction to engage and drive the workpiece;
   g. said means for rotating rotatably drives said retainer ring.

2. The apparatus of claim 1 wherein:
   a. said mounting plate is received inside the retainer ring; and
   b. means are provided for confining said mounting plate loosely in position inside the retainer ring.

* * * * *